United States Patent [19]
Anderson

[11] 3,841,913
[45] Oct. 15, 1974

[54] UNITARY CATHODE COVER

[75] Inventor: Charles E. Anderson, Monona, Wis.

[73] Assignee: ESB Incorporated, Philadelphia, Pa.

[22] Filed: Dec. 15, 1972

[21] Appl. No.: 315,301

[52] U.S. Cl. .............................. 136/107, 136/133
[51] Int. Cl. ........................................ H01m 1/02
[58] Field of Search ........... 136/107, 133, 135, 169, 136/175, 128, 13–14, 166, 111

[56] References Cited
UNITED STATES PATENTS

| | | | |
|---|---|---|---|
| 2,794,060 | 5/1957 | MacFarland | 136/133 |
| 2,802,042 | 8/1957 | Anthony et al. | 136/133 |
| 2,985,703 | 5/1961 | Kempf et al. | 136/166 |
| 3,061,660 | 10/1962 | Schenk, Jr. | 136/133 |
| 3,082,285 | 3/1963 | Stark, Jr. | 136/169 X |
| 3,506,495 | 4/1970 | Reilly et al. | 136/107 |
| 3,615,860 | 10/1971 | Terlecke | 136/107 |
| 3,756,859 | 9/1973 | Krey | 136/107 |

Primary Examiner—Anthony Skapars

[57] ABSTRACT

An improved unitary cathode cover having a raised terminal cap portion, a disc portion, an outer rim portion and a wall portion depending downwardly from the disc portion to the outer rim portion, which cover when assembled into a battery having a carbon cathode rod, exerts a downward axial compressive force on said rod thus stabilizing it between the cathode cover and the bottom of the battery.

3 Claims, 3 Drawing Figures

UNITARY CATHODE COVER

BACKGROUND OF THE INVENTION

1. Field of the Invention — This invention relates to an improved unitary conductive cathode cover and a battery containing same. More particularly, the invention relates to a battery comprising a cylindrical metal container anode, a carbon rod cathode, and electrolyte therebetween, an outer cylindrical container and a vented conductive cathode cover wherein the conductive cathode cover is so constructed that by assembling it into the battery it effects a stabilizing downward compressive force on the carbon cathode rod which helps to maintain the carbon cathode rod in electrical contact with the conductive cathode cover.

2. Description of the Prior Art — A problem frequently encountered in those dry cells utilizing a carbon rod cathode is the danger of displacing the carbon rod or cathode cover from its desired position in the assembled cell resulting in a loss of electrical contact between this carbon cathode rod and the positive terminal or cathode cover of the battery. Such loss of electrical contact or increase in contact resistance can readily occur when the battery is dropped or jarred and the carbon cathode rod contained therein is even slightly displaced from its intended position with the battery. Those skilled in the art are continually attempting to construct batteries wherein the carbon cathode rod and cathode cover are rendered relatively immobile thus insuring the maintenance of electrical contact between the carbon rod and the positive battery terminal.

A novel conductive cathode cover and battery containing same have now been discovered whereby the cathode cover, when assembled in the battery, exerts a downward compressive force on the carbon cathode rod thus axially compressing and stabilizing the carbon cathode rod between the cathode cover and the bottom of the battery into which it is assembled.

SUMMARY OF THE INVENTION

This invention is directed to a unitary conductive cathode cover having a raised terminal cap portion with an open bottom end, a disc portion extending outwardly from the open end of said cap, an outer rim portion and a wall portion depending downwardly from the disc portion to the outer rim portion. In a first position, prior to assembly into a battery, the angle between the disc portion of the cathode cover and the terminal cap portion thereof is an acute angle. In a second position, upon assembly of the conductive cathode cover into the battery, the angle between the disc portion and the terminal cap portion of the cathode cover is increased. This results in the downward axial compression of the carbon cathode rod of the battery thus effecting the stabilization of the cathode rod between the conductive cathode cover and the bottom of the battery. A battery in which this conductive cathode cover is utilized is also included within the scope of the present invention.

DESCRIPTION OF THE INVENTION

Figure 1:
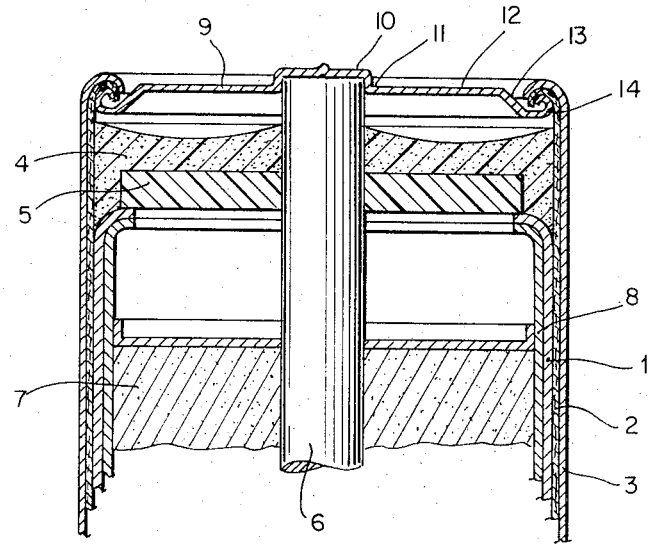
FIG. 1 shows a vertical elevation, partially in section, of a dry cell battery construction utilizing the conductive cathode cover of the present invention.

A novel unitary conductive cathode cover has now been discovered and placed in combination with other battery elements to comprise a novel dry cell battery which overcomes an art recognized problem, i.e. loss of electrical contact between carbon cathode rod and positive battery terminal as a result of carbon rod displacement within the assembled battery.

The dry cell battery of the present invention comprises in combination the following elements:
1. an inner cylindrical metal container anode closed at its bottom end and open at its top end. This metal container anode may be made of any suitable electro-negative material such as zinc or magnesium,
2. a carbon cathode rod positioned inside the container anode along the vertical axis of the container anode; this carbon cathode rod is electrically insulated from the bottom of the metal container anode by any suitable insulating material,
3. a suitable electrolyte such as zinc chloride or ammonium chloride between the metal container anode and the carbon cathode rod,
4. a unitary conductive cathode cover according to the present invention, and
4. a wall portion depending downwardly from the disc portion of the outer rim portion.

The cathode cover which may be made of any useful spring metal, e.g., tin plated steel, aluminum coated steel or nickel plated steel, is so positioned in the assembled battery that the vertical axis of the terminal cap portion of the cathode cover corresponds generally to the vertical axis of the carbon rod, i.e., it sits atop and envelopes the end portion of the carbon cathode rod. Prior to its assembly into the battery, the configuration of the cathode cover is such that the angle between the disc portion and the terminal cap portion of the cathode cover is an acute angle. When the cathode cover is, however, assembled into the battery, the upper inside wall of the outer cylindrical battery container is crimped downward over the outer rim portion of the cathode cover thus depressing the outer rim portion of the cathode cover downwardly to such an extent that the angle between the disc portion and the terminal cap portion of the cathode cover is now greater, i.e., increased, preferably to approximate a right angle, i.e., the outer rim portion of the cathode cover is depressed to such an extent that the configuration of the spring metal cathode cover is altered to reflect the downward force being exerted on the outer rim portion thereof. As a result of the downward compressed force on the outer rim portion, and the resultant deformation of the spring metal cathode cover, a downward compressive force is effected across the entire surface of the cathode cover. This, in turn, effects an axial compressive force on the carbon cathode rod beneath the terminal cap portion of the cathode cover which axially compressed the carbon cathode rod between the cathode cover and the bottom end of the battery which will normally be the bottom end of the container anode separated from the carbon cathode rod by electrically insulative material.

A clearer understanding of the present invention can be had by reference to the figures. FIG. 1 is a vertical elevation partially in section of a dry cell battery utilizing the conductive cathode cover of the present invention. In the construction of this battery, we have an inner cylindrical metal container anode 1 of a suitable electronegative material, an electrically insulative material 2 which may be of any suitable material such as paper and which may not be necessary if the outer cylindrical container 3 is constructed of or coated with a non-conductive material. The material and type of construction of closure sealing means 4 and 5 will depend on the specific cell construction and its intended use and can be readily determined by those skilled in the art. Carbon cathode rod 6 is positioned inside the metal container anode 1 and along its vertical axis and is electrically insulated from the bottom of said anode by means of insulating material 15. Any useful electropositive material such as manganese dioxide may be utilized as the depolarizer mix 7 and useful electrolyte gels or separators 8 will be known to those skilled in the art. The cathode cover of the invention 9 is a unitary cover having a raised terminal cap portion 10 which envelopes at least the end portion of the protruding carbon rod 6, a disc portion 12 extending outwardly from the open end of the terminal cap portion at an approximate right angle to said terminal cap portion, a downwardly depending wall portion 13 and an outer rim portion 14 which is compressed downwardly by the downwardly crimped upper inside wall of the outer cylindrical container 3.

Figure 2:
FIG. 2 is a cross-sectional view of a cathode cover according to this invention prior to its assembly into the battery.

FIG. 2 is a cross-sectional view of a unitary conductive cathode cover of the present invention as it would appear prior to assembly in a battery. It will be noted that since the outer rim portion of the cathode cover has not yet been subjected to the compressive force of the downward crimping of the outer cylindrical container of the battery, the spring metal of the cathode cover has not yet been depressed and thus the angle 21 of the disc portion and the raised terminal cap portion of the cathode cover has not yet been increased to approximate, for example, the right angle of FIG. 1. By the term increased or greater angle in the assembled battery is intended merely that the outer rim portion of the cathode cover is depressed to an extent sufficient to deform the spring metal cathode cover such that the increased angle effects a compressive downward force across the surface of the cathode cover with an attendant axial compressive downward force being exerted on the carbon cathode rod. It is preferred that this angle in an assembled battery approximate a right angle to insure that adequate compressive force is in fact being applied across the surface of the cathode cover to exert the necessary axial compressive force on the carbon cathode rod. The solid lines of FIG. 2 represent the cathode cover before assembly into the battery, the broken lines represent the cover after assembly into the battery.

Figure 3:
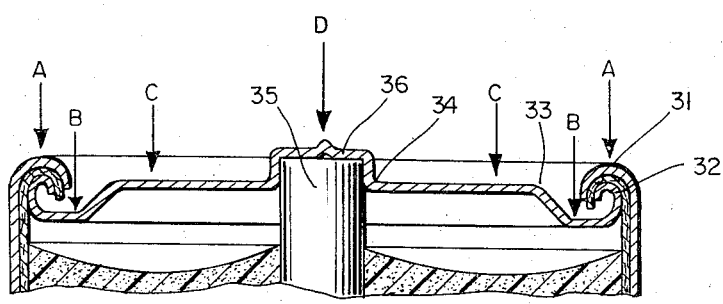
FIG. 3 is an enlarged view of portions of a battery similar to that in FIG. 1, utilizing a conductive cathode cover in accordance with this invention.

FIG. 3 represents an enlarged part view of a portion of a vertical elevation partially in section of a dry cell utilizing the cathode cover of this invention. This cell is constructed in a manner similar to that of FIG. 1. The upper inside wall of the outer cylindrical container is downwardly crimped 31 over the outer rim portion 32 of the cathode cover thus creating a downward compressive force A and B on the outer rim portion of the cathode cover sufficient to deform the spring metal cathode cover and increase angle 34 to such an extent as to effect a compressive force C across the entire surface of the cathode cover which in turn exerts an axial compressive force D on carbon cathode rod 35 thus axially compressing and stabilizing the carbon cathode rod between the cathode cover 36 and the insulated bottom of the cylindrical metal container anode.

The foregoing detailed description and drawings have been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. In a battery comprising an inner cylindrical metal container anode closed at its bottom end and open at its top end; a carbon cathode rod positioned inside the container anode and along its vertical axis, said cathode rod being electrically insulated from the bottom of said anode; an electrolyte between said anode and said cathode rod; a vented conductive cathode cover, and an outer cylindrical container having a downwardly crimped upper inside wall, wherein a portion of the carbon cathode rod protrudes beyond the open top end of the container anode, the improvement comprising a unitary conductive spring metal cathode cover having:

A. a raised terminal cap portion which envelopes at least the end portion of the carbon rod protrusion, said cap portion having an open bottom end;
B. a disc portion extending outwardly from the open end of said cap;
C. an outer rim portion; and
D. a wall portion depending downwardly from the disc portion to the outer rim portion, wherein the vertical axis of the terminal cap portion of the cathode cover corresponds generally to the vertical axis of the carbon cathode rod and wherein:

a. in a first position, prior to assembly into the battery, the angle between the disc portion and the terminal cap portion of said cathode cover is an acute angle; and
b. in a second position, upon assembly into the battery, the upper inside wall of the outer container is crimped downwardly over the outer rim portion of the cathode cover so as to exert a downward compressive force on said cover and
  i. the angle between the disc portion and the terminal cap portion of said cathode cover is greater than the angle prior to assembly into the battery, and
  ii. the carbon cathode rod is axially compressed between the cathode cover and the bottom end of the container anode.

2. A battery according to claim 1 wherein the angle of (b)(i) between the disc portion and the terminal cap portion of the cathode cover approximates a right angle.

3. A battery according to claim 1 wherein the spring metal is selected from the group consisting of tin plated steel, aluminum coated steel and nickel plated steel.

* * * * *